(12) United States Patent
Spyra et al.

(10) Patent No.: US 10,794,302 B2
(45) Date of Patent: Oct. 6, 2020

(54) METHODS OF KNOCK CONTROL

(71) Applicant: INNIO Jenbacher GmbH & Co OG, Jenbach, Tirol (AT)

(72) Inventors: Nikolaus Spyra, Tirol (AT); Josef Thalhauser, Nussdorf (DE); Christian Thorsten Trapp, Absam (AT); Georg Tinschmann, Schwaz (AT)

(73) Assignee: INNIO Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 15/736,152

(22) PCT Filed: Jun. 14, 2016

(86) PCT No.: PCT/AT2016/050199
§ 371 (c)(1),
(2) Date: Apr. 2, 2018

(87) PCT Pub. No.: WO2016/201472
PCT Pub. Date: Dec. 22, 2016

(65) Prior Publication Data
US 2018/0252171 A1    Sep. 6, 2018

(30) Foreign Application Priority Data
Jun. 15, 2015 (AT) .................................. A 375/2015

(51) Int. Cl.
*F02D 35/02* (2006.01)
*F02D 13/02* (2006.01)
*F02D 41/00* (2006.01)

(52) U.S. Cl.
CPC ......... *F02D 35/027* (2013.01); *F02D 13/023* (2013.01); *F02D 13/0269* (2013.01); *F02D 2041/0067* (2013.01); *Y02T 10/142* (2013.01)

(58) Field of Classification Search
CPC .. F02D 35/027; F02D 13/023; F02D 13/0269; F02D 2041/0067
See application file for complete search history.

(56) References Cited

U.S. PATENT DOCUMENTS 5,845,613 A * 12/1998 Yoshikawa ............. F01L 1/344
123/90.15
6,055,948 A * 5/2000 Shiraishi ................... F01L 1/34
123/243
(Continued)

FOREIGN PATENT DOCUMENTS

EP           0854280 A1      7/1998
EP         1 317 613 B1      4/2004
(Continued)

OTHER PUBLICATIONS

First Office Action and Search Report issued in connection with corresponding AT Application No. A375/2015 dated Apr. 29, 2016.
(Continued)

*Primary Examiner* — Sizo B Vilakazi
(74) *Attorney, Agent, or Firm* — Fletcher Yoder, P.C.

(57) ABSTRACT

A method for a knock control for an internal combustion engine with at least one cylinder, which is assigned to at least one intake valve, when knocking occurs in at least one cylinder by actuation of the intake valve associated with the cylinder detected as knocking, in such a way that the temperature of the charge of the cylinder detected as knocking is reduced, the knocking in the cylinder is reduced, on actuating the intake valve associated with the cylinder detected as knocking, a cylinder-specific and/or a global measure for power compensation of the internal combustion engine is performed.

20 Claims, 3 Drawing Sheets

(56) References Cited

U.S. PATENT DOCUMENTS

| | | | | |
|---|---|---|---|---|
| 6,536,411 | B2* | 3/2003 | Ganser | F02D 11/105 |
| | | | | 123/406.44 |
| 6,736,109 | B2* | 5/2004 | Hoshino | G01L 23/225 |
| | | | | 123/406.29 |
| 6,814,054 | B2* | 11/2004 | Sauler | F02D 37/02 |
| | | | | 123/406.21 |
| 6,848,422 | B2* | 2/2005 | Hashizume | F02D 13/023 |
| | | | | 123/406.29 |
| 6,910,451 | B2 | 6/2005 | Maeyama et al. | |
| 6,910,461 | B2 | 6/2005 | Tanei et al. | |
| 2003/0209234 | A1* | 11/2003 | Kinomura | F02D 13/0207 |
| | | | | 123/568.22 |
| 2006/0102136 | A1 | 5/2006 | Bromberg et al. | |
| 2015/0226144 | A1* | 8/2015 | Sixel | F02D 37/02 |
| | | | | 123/90.15 |

FOREIGN PATENT DOCUMENTS

| | | |
|---|---|---|
| EP | 1 872 001 A2 | 1/2008 |
| EP | 2 314 862 A1 | 4/2011 |
| JP | 2000-356144 A | 12/2000 |
| JP | 2001159338 A | 6/2001 |
| JP | 2011122544 A | 6/2011 |
| JP | 2013-047487 A | 3/2013 |
| WO | 2006/108076 A2 | 10/2006 |
| WO | 2008/000568 A1 | 1/2008 |

OTHER PUBLICATIONS

PCT International Search Report and Written Opinion; Application No. PCT/AT2016/050199; dated Oct. 11, 2016; 12 pages.

* cited by examiner

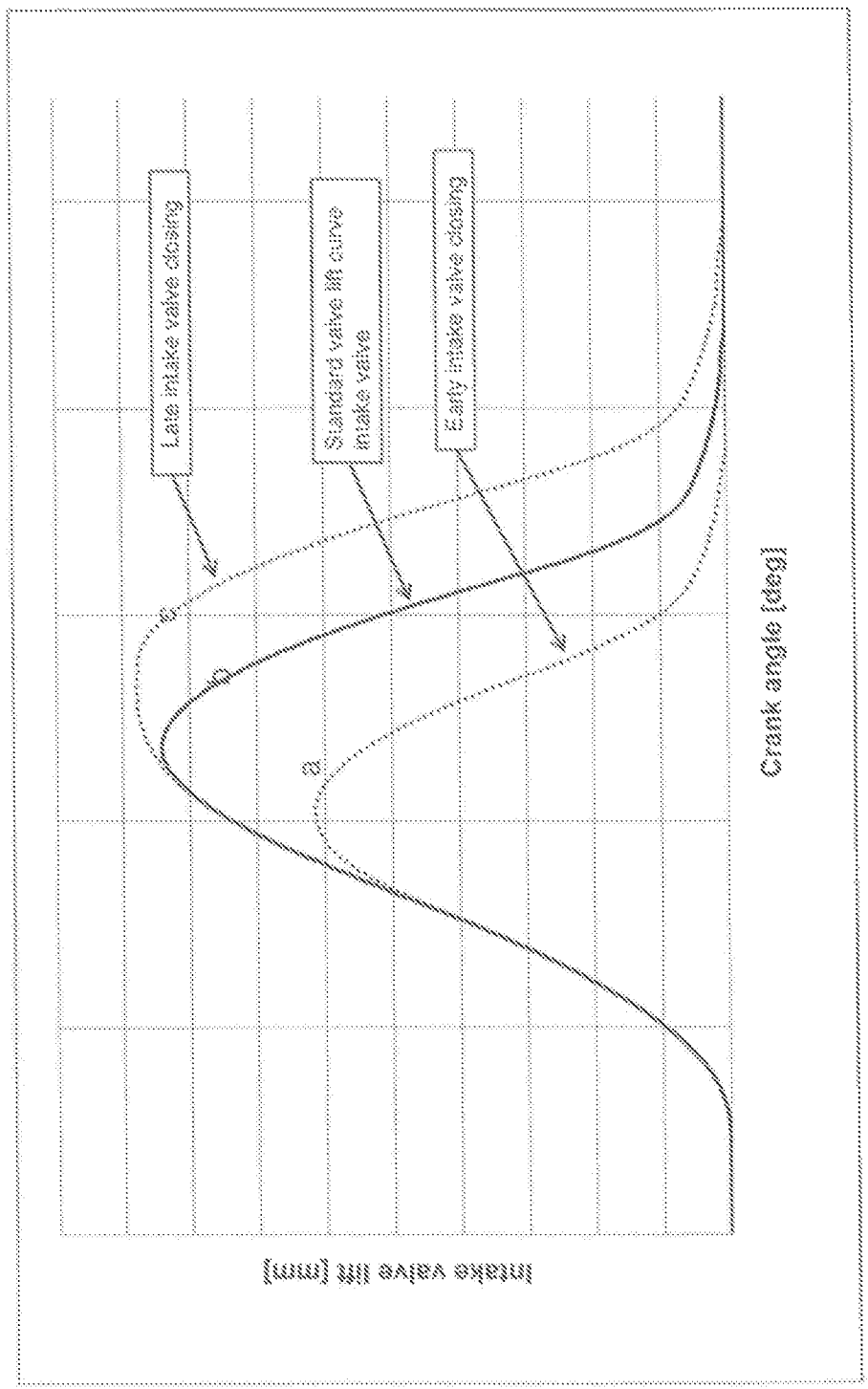

METHODS OF KNOCK CONTROL

FIELD OF INVENTION

The invention relates to a knock control method for an internal combustion engine with the characteristics of the preamble of claim 1 and an internal combustion engine with the characteristics of the preamble of claim 5.

BACKGROUND OF THE INVENTION

For knock control of internal combustion engines, it is known that the ignition time can be used as a correcting variable. If knocking is detected by a knock sensor in a cylinder of the internal combustion engine, the knock control changes the ignition time of the cylinder in question for the next combustion cycle to a later time, i.e. the ignition of the fuel-air mixture in the cylinder concerned is triggered later in the following combustion cycle than in the previous combustion cycle. By adjusting the ignition time to a later time (known as "retarding the ignition time"), the center of combustion mass is shifted and so the cylinder in question is moved away from the knock limit. The disadvantage of knock control based on the adjustment of the ignition time is that the efficiency of the internal combustion engine is impaired.

U.S. Pat. No. 6,848,422 B2 (Toyota) discloses a method for knock control of an internal combustion engine equipped with a variable valve train, whereby the knock control consists of delaying the valve opening of the intake valve when the operating angle of the intake valve is smaller than 180°. Outside of this window, the knock control occurs by adjusting the ignition time.

WO 2008/000568 A1 (Siemens) discloses a method for knock control according to which, when cylinders in the internal combustion engine are detected as knocking by means of a dynamic air-charging actuator (impulse charger), the cylinder is filled for the next combustion process with a smaller air mass than for the current combustion process. The impulse chargers are used for the pulse-type air filling of the individual cylinders by exploiting resonance vibration and amplification effects from the air mass flow in the intake manifold. The impulse charger actuators are opened for those periods during which a pulse-like air mass flow flows through the respective intake duct.

Due to the lower cylinder filling, i.e. less air mass metering in the combustion chamber of the respective cylinder, at which knocking is detected for the current combustion process, a reduction in the the susceptibility of the cylinder concerned to knocking is achieved for the subsequent combustion cycles. A disadvantage of this method is that, in the intake tract of the internal combustion engine, special air filling actuators must be provided to influence the air filling of the individual cylinders.

An object of embodiments of this invention is to provide a method for knock control of an internal combustion engine which does not have the disadvantages of the prior art, in particular the loss of efficiency. A corresponding internal combustion engine will also be indicated.

On the occurrence of knocking in at least one cylinder through actuation of the intake valve corresponding to the cylinder detected as knocking, such that the temperature of the charge of the cylinder detected as knocking is reduced, the knocking in the cylinder is reduced, and an effective knock control is implemented without the internal combustion engine suffering a loss of efficiency.

In an embodiment, the temperature of the charge of the cylinder detected as knocking is reduced for the next combustion cycle in comparison to the preceding combustion cycle.

It is in an embodiment provided that the occurrence of knocking is determined by at least one knock sensor in the cylinder.

The knock sensor can be designed as, for example, a structure-borne sound sensor or a cylinder pressure sensor.

It is in an embodiment provided that the actuation of the intake valve corresponding to the cylinder detected as knocking comprises a preceding closure, in an embodiment an earlier closure compared to the preceding combustion cycle.

According to this variant, with a cylinder detected as knocking, the associated intake valve is closed earlier in the intake stroke, e.g. via a variable valve train. The earlier closure of the intake valve in the intake stroke causes a cooling of the cylinder charge due to the increased adiabatic expansion compared to the preceding compression stroke. With this measure, the peak temperature of the cylinder charge is reduced, thus preventing knocking without adjusting the ignition time.

With a variable valve train, the opening and closing times and/or the valve lift curves—in short, the actuation characteristics—of the intake valves can be changed. The actuation characteristic of the intake valves is thus decoupled or at least partially decoupled from the specification of the camshaft.

An embodiment of the invention, a variable valve train with cylinder-specific control of the intake valves is required.

If the internal combustion engine includes a cooled EGR mechanism, by means of which the cylinders of the internal combustion engine can be supplied via the intake valves with cooled exhaust gas, then the actuation of the intake valve corresponding to the cylinder detected as knocking comprises a later closure, and in an embodiment a later closure compared to the last combustion cycle.

According to this variant, it is therefore provided that the temperature of the cylinder charge is reduced (and thus knocking is prevented) by supplying an increased quantity of cooled exhaust gas into the cylinder concerned. This results in a reduced temperature in the combustion in the compression stroke of the cylinder concerned due to the increased quantity of inert ingredients in the cylinder charge.

In both process variants, if the power output of the internal combustion engine must be kept constant, a measure for power compensation can be set according to an embodiment of the invention.

The power compensation can be performed so that those cylinders that are further away from the knock limit have longer intake valve opening times, whereby their power contribution is increased. In this case, the power compensation is a cylinder-specific measure.

The measure for power compensation may consist of an increase in the charge-air pressure of the internal combustion engine, i.e. a global measure which applies to all piston-cylinder units is set here.

In both cases, the ignition time can be maintained.

In an embodiment particularly well-suited to a full-load range of an internal combustion engine.

It is in an embodiment provided that the internal combustion engine is operated with Miller cycle timing.

In an embodiment particularly suitable for stationary internal combustion engines, particularly with a generator to internal combustion engines coupled with a genset, in particular gas engines.

BRIEF DESCRIPTION OF THE DRAWINGS

In an embodiment explained in more detail with reference to the figures. The figures show the following.

DETAILED DESCRIPTION OF THE INVENTION

Figure 1:
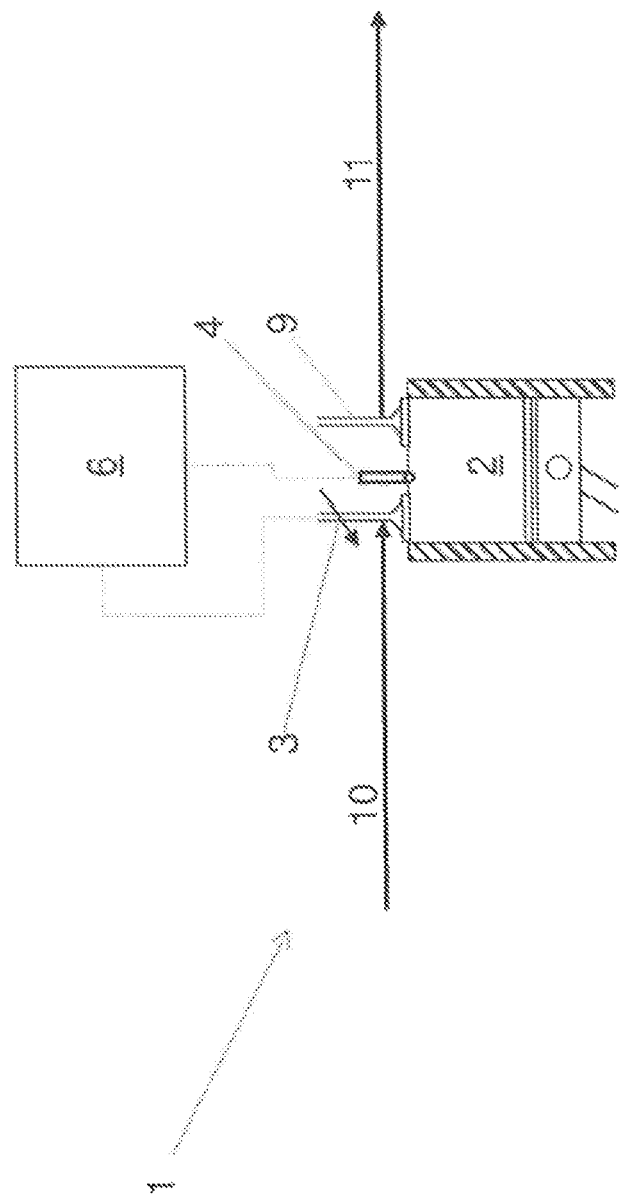
FIG. 1 A schematic representation of an internal combustion engine

FIG. 1 shows schematically an internal combustion engine 1 in a first exemplary embodiment, whereby only one cylinder 2 is shown. In practice, internal combustion engines often have multiple cylinders 2.

Via an intake duct 10, a fuel-air mixture can enter a combustion chamber designed in the cylinder 2. The quantity and the time characteristics of the entry of the fuel-air mixture are determined by a variable actuatable intake valve 3. In other words, a variable valve train is implemented in the internal combustion engine 1. The actuation characteristics of the intake valve 3 can be changed by a control/regulating device 6.

Via a knock sensor 4, characteristic signals for the knocking of the internal combustion engine can be sent to the control/regulating device 6.

The knock sensor 4 can be designed as, for example, a structure-borne sound sensor.

From the combustion chamber of the internal combustion engine 1, exhaust gas flows via an outlet valve 9 into an outlet duct 11.

If knocking is detected by the knock sensor 4 in the cylinder 2, the control/regulating device 6 can control the intake valve 3 so that it closes earlier than during the last combustion cycle (the cycle in which knocking was detected). Because of the earlier closure of the intake valve 3, the charge participating in the compression decreases in the cylinder 2. The temperature of the charge of the cylinder detected as knocking 2 is thus reduced for the next combustion cycle compared to the preceding combustion cycle and the knocking in the cylinder concerned is reduced.

Figure 2:
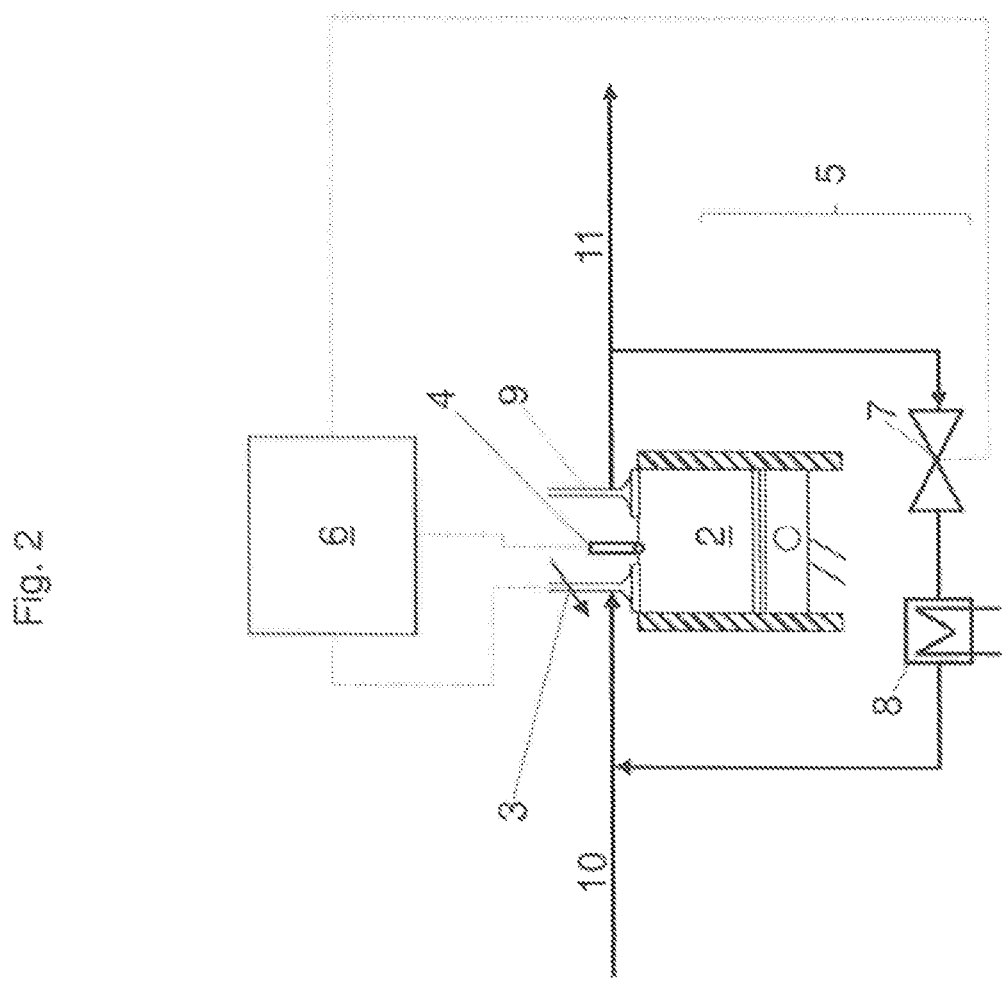
FIG. 2 A schematic representation of an internal combustion engine in a further exemplary embodiment, FIG. 3 Valve lift curves of an intake valve

FIG. 2 shows schematically an internal combustion engine 1 in a further exemplary embodiment whereby, in addition to the exemplary embodiment of FIG. 1, an EGR mechanism 5 is provided. For the variable valve train, the same as stated in 1 applies.

The EGR mechanism 5 can branch off from the outlet duct 11 and pass back into the intake duct 10. The EGR mechanism 5 includes, in addition to the EGR line 12, a controllable valve 7 and a cooler 8. Through the cooler 8 designed as a heat exchanger, the temperature of the branched exhaust gas fed again into the intake duct 10 can be reduced. The quantity of the recirculated exhaust gas can be varied via the control/regulating device.

If, in an internal combustion engine 1 of this form, i.e. with a cooled or coolable EGR mechanism 5, knocking is now detected by the knock sensor 4 in the cylinder 2, the control/regulating device 6 can control the intake valve 3 so that it closes earlier than during the last combustion cycle (the cycle in which knocking was detected). According to this variant, it is therefore provided that the temperature of the cylinder charge is reduced (and thus knocking is prevented) by supplying an increased quantity of cooled exhaust gas compared to the preceding combustion cycle into the cylinder 2 concerned. This results in a reduced temperature in the combustion in the compression stroke of the cylinder 2 concerned due to the increased quantity of inert ingredients in the cylinder charge compared to the preceding combustion cycle, whereby the cylinder 2 concerned is less prone to knocking.

The signal connections of the control/regulating device 6 for the variably actuatable intake valve 3, the knock sensor 4 and the valve 7 of the EGR mechanism 5 are shown with dashed lines.

FIG. 3 shows three valve lift curves a, b, c of the intake valves 3 according to the two exemplary embodiments discussed, as well as an output condition.

Curve a represents the valve lift curve for the case in which, due to the earlier intake valve closure, the temperature of the cylinder charge is reduced and knocking is thus prevented.

Curve b represents the valve lift curve during normal operation.

Curve c represents the valve lift curve for the case in which, due to the later intake valve closure in connection with the cooled EGR mechanism 5, the temperature of the cylinder charge is reduced and knocking is thus prevented.

It is seen that the valve opening time can remain unchanged due to the measures.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
controlling one or more parameters of each combustion chamber of a plurality of combustion chambers of an internal combustion engine to reduce knock, wherein the one or more parameters are controlled differently for the plurality of combustion chambers depending on a level of input from one or more knock sensors, wherein the one or more parameters comprise at least closure times of a plurality of intake valves associated with the plurality of combustion chambers, wherein controlling comprises:
identifying a knock condition associated with a combustion chamber of the plurality of combustion chambers based on the level of input from the one or more knock sensors; and
adjusting a closure time of an intake valve of the plurality of intake valves associated with the combustion chambers to reduce the knock condition, wherein the closure time is adjusted to be earlier when the intake valve controls an intake of air without a cooled exhaust gas, or the closure time is adjusted to be later when the intake valve controls an intake of the air with the cooled exhaust gas.

2. The method of claim 1, wherein the closure time is adjusted to be earlier when the intake valve controls the intake of air without the cooled exhaust gas.

3. The method of claim 1, wherein the closure time is adjusted to be later when the intake valve controls the intake of the air with the cooled exhaust gas.

4. The method of claim 1, wherein the one or more parameters comprise opening durations of the intake valves associated with the plurality of combustion chambers.

5. The method of claim 4, wherein controlling comprises controlling a first intake valve to open for a shorter first opening duration for a first combustion chamber experiencing knock or greater knock relative to a second opening duration of a second intake valve for a second combustion chamber not experiencing knock or lesser knock based on the level of input from one or more knock sensors.

6. The method of claim 1, wherein the one or more parameters comprise power contributions of the plurality of combustion chambers.

7. The method of claim 6, wherein controlling comprises controlling a first power contribution to be lesser for a first combustion chamber experiencing knock or greater knock relative to a second power contribution for a second combustion chamber not experiencing knock or lesser knock.

8. The method of claim 1, comprising controlling a flow of a cooled fluid into at least one of the plurality of combustion chambers to reduce knock in response to the input from one or more knock sensors.

9. The method of claim 8, wherein the cooled fluid comprises a cooled inert fluid.

10. The method of claim 8, wherein the cooled fluid comprises the cooled exhaust gas.

11. A system, comprising:
an engine controller configured to control one or more parameters of each combustion chamber of a plurality of combustion chambers of an internal combustion engine to reduce knock, wherein the one or more parameters are controlled differently for the plurality of combustion chambers depending on a level of input from one or more knock sensors, wherein the one or more parameters comprise at least closure times of a plurality of intake valves associated with the plurality of combustion chambers, wherein the engine controller is configured to:
identify a knock condition associated with a combustion chamber of the plurality of combustion chambers based on the level of input from the one or more knock sensors; and
adjust a closure time of an intake valve of the plurality of intake valves associated with the combustion chambers to reduce the knock condition, wherein the closure time is adjusted to be earlier when the intake valve controls an intake of air without a cooled exhaust gas, or the closure time is adjusted to be later when the intake valve controls an intake of the air with the cooled exhaust gas.

12. The system of claim 11, comprising the internal combustion engine having the engine controller.

13. The system of claim 12, comprising a variable valve train configured to provide variable control of the intake valves.

14. The system of claim 11, wherein the closure time is adjusted to be earlier when the intake valve controls the intake of air without the cooled exhaust gas.

15. The system of claim 11, wherein the one or more parameters comprise opening durations of the intake valves associated with the plurality of combustion chambers, wherein the engine controller is configured to control a first intake valve to open for a shorter first opening duration for a first combustion chamber experiencing knock or greater knock relative to a second opening duration of a second intake valve for a second combustion chamber not experiencing knock or lesser knock based on the level of input from one or more knock sensors.

16. The system of claim 11, wherein the one or more parameters comprise power contributions of the plurality of combustion chambers, wherein the engine controller is configured to control a first power contribution to be lesser for a first combustion chamber experiencing knock or greater knock relative to a second power contribution for a second combustion chamber not experiencing knock or lesser knock.

17. The system of claim 11, wherein the engine controller is configured to control a flow of a cooled fluid into at least one of the plurality of combustion chambers to reduce knock in response to the input from one or more knock sensors.

18. The system of claim 17, comprising an exhaust gas recirculation (EGR) system configured to recirculate an exhaust gas into an intake of the internal combustion engine, wherein the EGR system comprises a cooler configured to cool the exhaust gas to produce the cooled exhaust gas, wherein the cooled fluid comprises the cooled exhaust gas wherein the closure time is adjusted to be later as the intake valve controls the intake of the air with the cooled exhaust gas.

19. A system, comprising:
an internal combustion engine having a plurality of combustion chambers and at least one intake valve associated with each combustion chamber of the plurality of combustion chambers; and
an engine controller configured to control one or more parameters of each combustion chamber of the plurality of combustion chambers to reduce knock, wherein the one or more parameters are controlled differently for the plurality of combustion chambers depending on a level of input from one or more knock sensors, wherein the one or more parameters comprise at least closure times of a plurality of intake valves associated with the plurality of combustion chambers, wherein the engine controller is configured to:
identify a knock condition associated with a combustion chamber of the plurality of combustion chambers based on the level of input from the one or more knock sensors; and
adjust a closure time of an intake valve of the plurality of intake valves associated with the combustion chambers to reduce the knock condition, wherein the closure time is adjusted to be earlier when the intake valve controls an intake of air without a cooled exhaust gas, or the closure time is adjusted to be later when the intake valve controls an intake of the air with the cooled exhaust gas.

20. The system of claim 19, wherein the closure time is adjusted to be earlier when the intake valve controls the intake of air without the cooled exhaust gas, and the closure time is adjusted to be later when the intake valve controls the intake of the air with the cooled exhaust gas.

* * * * *